US012706962B2

(12) United States Patent
Bouazizi et al.

(10) Patent No.: US 12,706,962 B2
(45) Date of Patent: Aug. 11, 2026

(54) SIGNALING USAGE OF PDU SET AND END OF BURST MARKING FOR COMMUNICATING WEBRTC MEDIA DATA

(71) Applicant: QUALCOMM Incorporated, San Diego, CA (US)

(72) Inventors: Imed Bouazizi, Frisco, TX (US); Dario Serafino Tonesi, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/629,617

(22) Filed: Apr. 8, 2024

(65) Prior Publication Data

US 2024/0340322 A1 Oct. 10, 2024

Related U.S. Application Data

(60) Provisional application No. 63/495,201, filed on Apr. 10, 2023.

(51) Int. Cl.
*H04L 65/1069* (2022.01)
*H04L 65/1101* (2022.01)
*H04L 65/65* (2022.01)

(52) U.S. Cl.
CPC ...... *H04L 65/1069* (2013.01); *H04L 65/1101* (2022.05); *H04L 65/65* (2022.05)

(58) Field of Classification Search
CPC ............. H04L 65/1069; H04L 65/1101; H04L 65/1104; H04L 65/65; H04L 65/80;
(Continued)

(56) References Cited

U.S. PATENT DOCUMENTS

2011/0219134 A1* 9/2011 Lidstrom .............. H04L 65/752 709/229
2017/0070781 A1* 3/2017 Bar Yanai ........ H04N 21/44008
(Continued)

FOREIGN PATENT DOCUMENTS

WO 2024039173 A1 2/2024

OTHER PUBLICATIONS

3GPP: "3rd Generation Partnership Project, Technical Specification Group Core Network and Terminals, T8 Reference Point for Northbound APIs (Release 18)", 3GPP TS 29.122, V18.1.0, Mar. 2023, 494 Pages.

(Continued)

*Primary Examiner* — Jason D Recek
(74) *Attorney, Agent, or Firm* — Shumaker & Sieffert, PA

(57) ABSTRACT

An example device for communicating media data includes a memory configured to store media data; and a processing system comprising one or more processors implemented in circuitry, the processing system being configured to: receive a session description protocol (SDP) message including configuration information representing at least one of protocol data unit (PDU) set marking or end of burst (EoB) marking for a communication session; send information representing the PDU set marking or the EoB marking for the communication session to a Real-time Communication (RTC) application function; and process media data of the communication session, the media data including at least one of a PDU set having the PDU set marking or an EoB having the EoB marking according to the configuration information.

20 Claims, 4 Drawing Sheets

(58) Field of Classification Search
CPC ............... H04L 65/1016; H04L 65/104; H04L 65/1108; H04L 65/75; H04L 67/146; H04L 67/147
See application file for complete search history.

(56) References Cited

U.S. PATENT DOCUMENTS

| | | | | |
|---|---|---|---|---|
| 2024/0064190 | A1* | 2/2024 | Yang | H04L 65/1069 |
| 2026/0089218 | A1* | 3/2026 | Stoica | H04L 67/131 |

OTHER PUBLICATIONS

3GPP: 3rd Generation Partnership Project, Technical Specification Group Services and System Aspects, 5G Real-time Media Transport Protocol Configurations (Release 18), TS 26.522 V0.2.0, Nov. 2023, 30 Pages.

3GPP TR 23.700-60: "3rd Generation Partnership Project, Technical Specification Group Services and System Aspects, Study on XR (Extended Reality) and Media Services (Release 18)", 3GPP Standard, Technical Report, 3rd Generation Partnership Project, Mobile Competence Centre, 650, Route Des Lucioles, F-06921 Sophia-Antipolis Cedex, France, No. V18.0.0, Dec. 21, 2022, pp. 1-266.

3GPP TS 23.501: "3rd Generation Partnership Project, Technical Specification Group Services and System Aspects, System Architecture for the 5G System (5GS), Stage 2 (Release 17)", 3rd Generation Partnership Project, Mobile Competence Centre, 650, Route Des Lucioles, F-06921, Sophia-Antipolis Cedex, France, 3GPP TS 23.501, V17.7.0, Dec. 2022, 573 Pages.

Bouazizi I (Qualcomm Inc)., et al., "[5G_RTP] RTP Header Extension for PDU Set Marking", 3GPP Draft, TSG SA4 Meeting #122, Tdoc S4-230139, Type Discussion, 5G_RTP, 3rd Generation Partnership Project, Mobile Competence Centre, 650, Route Des Lucioles, F-06921 Sophia-Antipolis Cedex, France, vol. 3GPP SA 4, No. Athens, GR, Feb. 20, 2023-Feb. 24, 2023, Feb. 14, 2023, XP052236587, 3 pages.

Bouazizi I (Qualcomm Inc)., et al., "[5G_RTP] Signaling End of Data Burst", 3GPP Draft, TSG SA4 RTC SWG Post #122 Ad-hoc Call, Tdoc S4aR230046, Type Discussion, 3rd Generation Partnership Project, Mobile Competence Centre, 650, Route Des Lucioles, F-06921 Sophia-Antipolis Cedex, France, vol. 3GPP SA 4, No. Online, Mar. 15, 2023-Mar. 29, 2023, Mar. 13, 2023, XP052255222, 2 pages.

Bouazizi I (Qualcomm Inc)., et al., "[5G_RTP] Signaling the Usage of PDU Set and End of Burst marking", 3GPP Draft, TSG SA4 SWG #123-e, Tdoc S4-230670, Type Discussion, 3rd Generation Partnership Project, Mobile Competence Centre, 650, Route Des Lucioles, F-06921 Sophia-Antipolis Cedex, France, vol. 3GPP SA 4, No. Online, Apr. 17, 20230417-Apr. 21, 2023, Apr. 21, 2023, XP052295507, 4 pages.

ETSI TS 129 514: "5G, 5G System, Policy Authorization Service, Stage 3 (3GPP TS 29.514 version 16.5.0 Release 16)", Aug. 2020, 178 Pages.

International Search Report and Written Opinion—PCT/US2024/023698—ISA/EPO—Jun. 18, 2024.

Singer D., et al., "A General Mechanism for RTP Header Extensions, rfc8285.txt", Internet Engineering Task Force (IETF), Obsoletes 5285, Standard, Internet Society (ISOC) 4, Rue Des Falaises CH-1205, Geneva, Switzerland, Oct. 26, 2017, pp. 1-25.

* cited by examiner

SIGNALING USAGE OF PDU SET AND END OF BURST MARKING FOR COMMUNICATING WEBRTC MEDIA DATA

This application claims the benefit of U.S. Provisional Application No. 63/495,201, filed Apr. 10, 2023, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques related to communicating (e.g., sending, receiving, or forwarding) Web Real-time Communication (WebRTC) data. The WebRTC data may include extended reality (XR) media data, which may include any or all of text data, audio data, video data, mixed reality (MR) data, augmented reality (AR) data, and/or virtual reality (VR) data. WebRTC data may be partitioned and encapsulated in protocol data units (PDUs), which may be communicated in bursts of activity on radio signals. Likewise, PDUs may be organized into PDU Sets, which may include a set of PDUs to be consumed together by a receiver. For example, a PDU Set may include respective PDUs including audio, video, and XR data. Furthermore, PDU Sets and ends of bursts (EoBs) may be marked to help identify XR traffic and optimize its delivery. According to techniques of this disclosure, various devices involved in communicating XR data and WebRTC data may indicate whether either or both of PDU Set marking and/or EoB marking is enabled for a particular WebRTC session. In this manner, network devices can detect XR data and WebRTC data and apply quality of service (QOS) policies to such data accordingly.

In one example, a method of communicating media data includes: receiving a session description protocol (SDP) message including configuration information representing at least one of protocol data unit (PDU) set marking or end of burst (EoB) marking for a communication session; sending information representing the PDU set marking or the EoB marking for the communication session to a Real-time Communication (RTC) application function; and processing media data of the communication session, the media data including at least one of a PDU set having the PDU set marking or an EoB having the EoB marking according to the configuration information.

In another example, a device for communicating media data includes: a memory configured to store media data; and a processing system comprising one or more processors implemented in circuitry, the processing system being configured to: receive a session description protocol (SDP) message including configuration information representing at least one of protocol data unit (PDU) set marking or end of burst (EoB) marking for a communication session; send information representing the PDU set marking or the EoB marking for the communication session to a Real-time Communication (RTC) application function; and process media data of the communication session, the media data including at least one of a PDU set having the PDU set marking or an EoB having the EoB marking according to the configuration information.

In another example, a computer-readable storage medium has stored thereon instructions that, when executed, cause a processor to: receive a session description protocol (SDP) message including configuration information representing at least one of protocol data unit (PDU) set marking or end of burst (EoB) marking for a communication session; send information representing the PDU set marking or the EoB marking for the communication session to a Real-time Communication (RTC) application function; and process media data of the communication session, the media data including at least one of a PDU set having the PDU set marking or an EoB having the EoB marking according to the configuration information.

In another example, a device for communicating media data includes: means for receiving a session description protocol (SDP) message including configuration information representing at least one of protocol data unit (PDU) set marking or end of burst (EoB) marking for a communication session; means for sending information representing the PDU set marking or the EoB marking for the communication session to a Real-time Communication (RTC) application function; and means for processing media data of the communication session, the media data including at least one of a PDU set having the PDU set marking or an EoB having the EoB marking according to the configuration information.

The details of one or more examples are set forth in the accompanying drawings and the description below. Other features, objects, and advantages will be apparent from the description and drawings, and from the claims.

DETAILED DESCRIPTION

Figure 1:
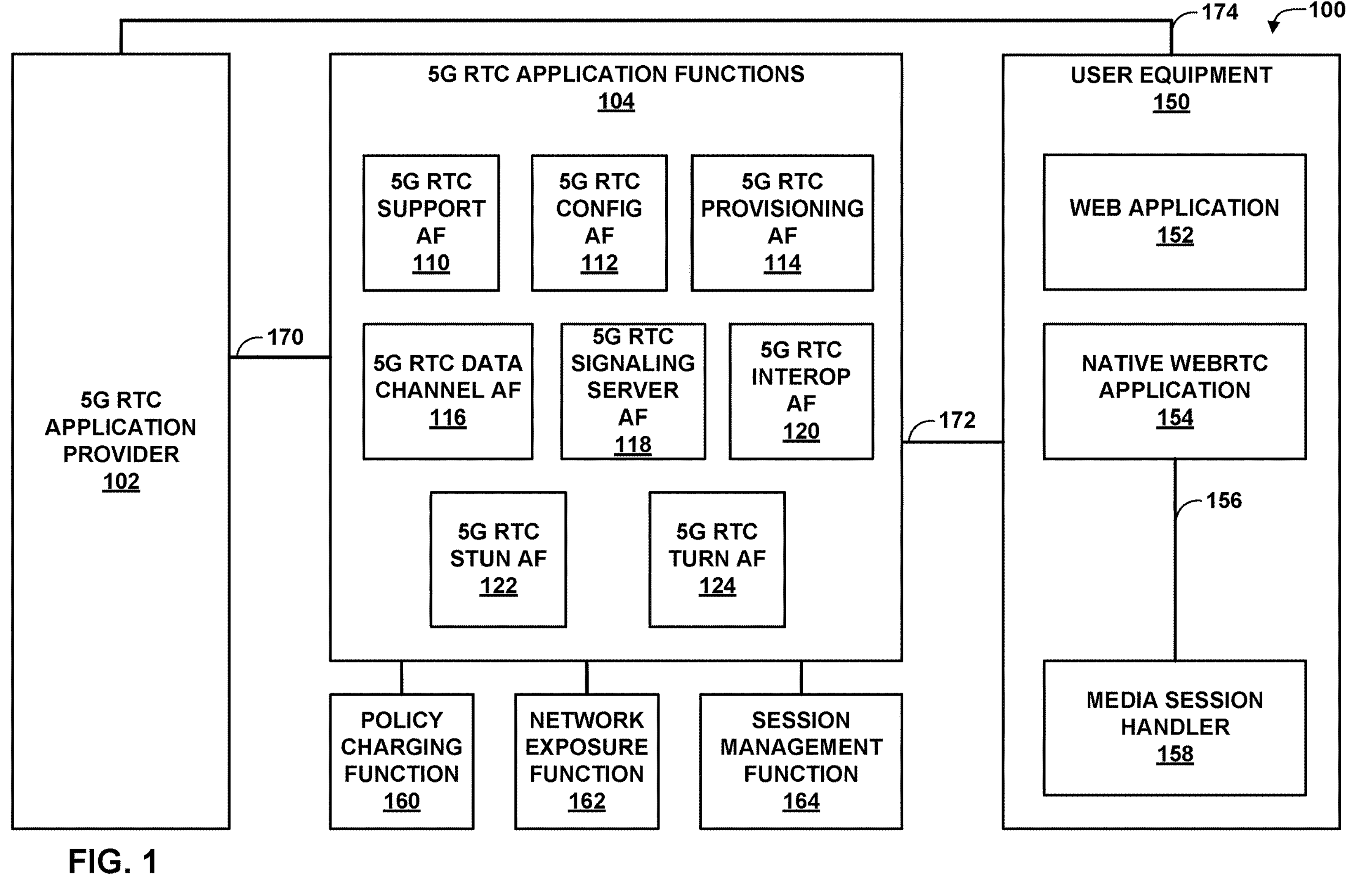
FIG. 1 is a block diagram illustrating an architecture for a system that may be configured to perform immersive real-time communication for Web Real-Time Communication (WebRTC) according to techniques of this disclosure.

In general, this disclosure describes techniques related to communicating media data, such as extended reality (XR) media data. XR media data may include any or all of text data, voice data, audio data, still image data, video data, mixed reality (MR) data, augmented reality (AR) data, and/or virtual reality (VR) data. The marking of XR traffic is a mechanism that helps the network to identify XR traffic and optimize its delivery. The concept of protocol data unit (PDU) Sets has been introduced specifically for this purpose, but can also be used for other types of traffic. PDU Sets are PDUs that are consumed together by the receiver, and as such should be handled together by the network. End of Burst (EoB) provides another tool to optimize delivery of the XR traffic by allowing for appropriate usage of Connected mode Discontinuous Reception (CDRX), in order to save power on the receiver side.

PDU Set marking may be performed for real-time transport protocol (RTP) or secure RTP (SRTP) traffic through the usage of an RTP header extension that is appended to an RTP packet header of each PDU of an RTP stream that has PDU Set marking activated. A user plane function (UPF) may inspect downlink traffic and extract information about PDU Set marking and pass the PDU Set to a base station, such as a gNode-B (gNB). This disclosure describes techniques related to signaling of configuration for PDU Set marking with a policy control function (PCF), which in turn may configure the UPF.

In general, a user equipment (UE) and an application server (AS) or other, remote UE may initially negotiate the usage of PDU Sets and EoB marking during an offer/answer exchange during session establishment or during an update, e.g., through a session initiation protocol (SIP) re-invite. According to RFC8285, negotiation of used RTP header extensions is performed through the inclusion of an "extmap" attribute. The uniform resource name (URN) for PDU Set marking may be set to "urn:3gpp:pdus-marking:rel-18".

The following options are supported for an RTP stream and apply to RTP packets of the RTP stream, throughout the lifetime of the RTP session:

One-byte or two-byte header extension format identified through the extension attribute "short" or "long" correspondingly. If not present, the header extension format shall be deduced from the preamble bytes 0xBEDE or 0x100 (+appbits). In any case, the Application Server shall not change the format during the RTP session.

PDU Set size in bytes identified through the presence of the string flag "pdu-set-size". If not present, the receiver shall assume that the PDU Set Size field is not present. This leads to a shorter header extension for that RTP session.

End of Burst marking identified through the presence of the string flag "end-of-burst." When not present, the receiver shall ignore the EoB bits.

The augmented Backus-Naur form (ABNF) syntax for the extmap attribute, per RFC8285, is:

```
extmap-attr="a=extmap:" 1*5DIGIT ["/" direction] SP "urn:3gpp:pdus-marking:rel-18" SP extensionattributes
extensionattributes = *3(format / "pdu-set-size" / "end-of-burst")
format = "short" / "long"
```

FIG. 1 is a block diagram illustrating an architecture 100 for a system that may be configured to perform immersive real-time communication for Web Real-Time Communication (WebRTC) according to techniques of this disclosure. In particular, architecture 100 may be used for 5G media streaming (5GMS) using WebRTC. That is, architecture 100 may be used to perform WebRTC real time communication over a 5G network connection.

Architecture 100 may be used to provide WebRTC in a variety of scenarios. As one example, architecture 100 may be used in conjunction with a 5G network to provide "over the top" (OTT) WebRTC. As another example, a mobile network operator (MNO) may provide trusted WebRTC functions and/or facility WebRTC services using architecture 100. As still another example, architecture 100 may provide inter-operable WebRTC services. Architecture 100 may also be used for various other scenarios as well. Architecture 100 provides flexibility through a set of functions and interfaces that can be combined in different ways based on the needs for a particular scenario.

In the example of FIG. 1, architecture 100 includes 5G RTC application provider 102, 5G RTC application functions 104, and user equipment (UE) 150. In general, 5G RTC application provider 102 interacts with functions of 5G RTC application functions 104 and supplies a 5G RTC-aware application, such as web application 152, to user equipment 150.

User equipment 150 may also be referred to as "UE" or a "client device." User equipment 150 may be, for example, a laptop or desktop computer, a digital camera, a digital recording device, a digital media player, a video gaming device, a video game console, a cellular or satellite radio telephone, a video teleconferencing device, or the like. In this example, user equipment 150 includes web application 152, native WebRTC application 154, and media session handler (MSH) 158. Interface 156 couples native WebRTC application 154 and MSH 158. Interface 156 may be referred to as an "RTC-6" interface. UE 150 and 5G RTC application provider 102 are coupled by interface 174, which may be referred to as an "RTC-8" interface.

MSH 158 is a function in UE 150 that provides WebRTC applications, such as web application 152, access to 5G RTC support functions, such as 5G RTC application functions 104. These functions may be offered on request through the interface 156 (the RTC-6 interface) or transparently without direct involvement of web application 154. MSH 158 may, for instance, assist indirectly in interactive connectivity establishment (ICE) negotiation by providing a list of Session Traversal Utilities for Network Address Translation (STUN) and/or Traversal Using Relay around NAT (TURN) server candidates that offer 5G RTC functionality. MSH 158 may also collect quality of experience (QoE) metric reports and submit consumption reports. MSH 158 may also offer media configuration recommendations to web application 152 through interface 156 (RTC-6).

Interface 170 (which may be referred to as an "RTC-1" interface) allows 5G RTC application provider 102 to provision support for offered RTC sessions as 5G RTC application functions 104. The provisioning may cover functionalities including quality of service (QOS) for WebRTC sessions, charging provisioning for WebRTC sessions, collection of consumption and QoE metrics data related to WebRTC sessions, offering ICE functionality, such as STUN and TURN servers, and/or offering WebRTC signaling servers, potentially with interoperability to other signaling servers.

In this example, 5G RTC application functions 104 include 5G RTC support application function (AF) 110, 5G RTC configuration (config) AF 112, 5G RTC provisioning AF 114, 5G RTC data channel AF 116, 5G RTC signaling server AF 118, 5G RTC interoperability (interop) AF 120, 5G RTC STUN AF 122, and 5G RTC TURN AF 124. In this example, 5G RTC application functions 104 are also interoperable with policy and charging function (PCF) 160, network exposure function (NEF) 162, and session management function (SMF) 164.

Interface 170, which may be referred to as a "provisioning interface," is not necessarily relevant to all collaboration scenarios, and some of the 5G support functionality may be offered without application provider provisioning.

Interface 172 (which may be referred to as an "RTC-5" interface) is an interface between MSH 158 and 5G RTC application functions 104. Interface 172 may be used to convey configuration information from 5G RTC application functions 104 to MSH 158 and to request support for a starting/ongoing WebRTC session. The configuration information may include static information such as recommendations for media configurations, configurations of STUN and TURN server locations, configuration about consumption and QoE reporting, or discovery information for WebRTC signaling and data channel servers and their capabilities.

MSH 158 may provide support functionality such as informing 5G RTC application functions 104 or web application 152 about a WebRTC session and its state, requesting QoS allocation for a starting or modified WebRTC session, receiving a notification about changes to the QoS allocation for an ongoing WebRTC session, or receiving, updating, or exchanging information about the WebRTC session with the 5G RTC STUN/TURN/Signaling Server, e.g., to identify a WebRTC session and associate it with a QoS template.

In some examples, the 5G functionality that offer application functions to the WebRTC application (including 5G RTC data channel AF 116, 5G RTC signaling server AF 118, 5G RTC interop AF 120, 5G RTC STUN AF 122, and 5G RTC TURN AF 124) may instead be provided by Application Servers (5G RTC AS) instead of AFs. The 5G RTC AS could then use a dedicated RTC-3 interface to request configurations and network support for the ongoing WebRTC sessions from the 5G RTC AF.

Functionality attributed to 5G RTC application provider 102, 5G RTC application functions 104, and UE 150 may be implemented in hardware, software, firmware, or any combination thereof. When implemented in software or firmware, memory may be provided for storing instructions that may be executed by one or more processors implemented in circuitry. Processors may include one or more of microprocessors, digital signal processors (DSPs), application specific integrated circuits (ASICs), field programmable gate arrays (FPGAs), discrete logic circuitry, or any combinations thereof.

According to the techniques of this disclosure, one or more of 5G RTC application functions 104 (e.g., 5G RTC signaling server AF 118) may be configured to use an Npcf_PolicyAuthorization procedure (per TS 29.514) or an N33 Nnef_AFSession WithQoS procedure (per TS 29.122) to request quality of service (QOS) allocation from PCF 160 or NEF 162 for a communication session between UE 150 and a remote UE or application server (not shown in FIG. 1). These methods may be extended to add support for signaling the PDU Set and EoB marking to PCF 160 or NEF 162, per the techniques of this disclosure. For example, a MediaSubComponent data type, per TS 29.514, may be extended as follows, where "<added> added text </added>" signifies added text relative to the MediaSubComponent data type of TS 29.514:

| Attribute name | Data type | P | Cardinality | Description | Applicability |
|---|---|---|---|---|---|
| afSigProtocol | AfSigProtoco | O | 0 . . . 1 | Indicates the protocol used for signalling between the UE and the NF service consumer. It may be included only if the "flowUsage" attribute is set to the value "AF_SIGNALLING". | ProvAFsignalFlow |
| ethfDescs | array(EthFlowDescription) | O | 1 . . . 2 | Contains the flow description for the Uplink and/or Downlink Ethernet flows. | |
| fNum | integer | M | 1 | Identifies the ordinal number of the service data flow. | |
| fDescs | array(FlowDescription) | O | 1 . . . 2 | Contains the flow description for the Uplink and/or Downlink IP flows. | |
| fStatus | FlowStatus | O | 0 . . . 1 | Indicates whether the status of the service data flows is enabled or disabled. | |
| flowUsage | FlowUsage | O | 0 . . . 1 | Flow usage of the flows (e.g. RTCP, AF signalling). | |
| marBwUl | BitRate | O | 0 . . . 1 | Maximum requested bandwidth for the Uplink. | |
| marBwDl | BitRate | O | 0 . . . 1 | Maximum requested bandwidth for the Downlink. | |
| tosTrCl | TosTrafficClass | O | 0 . . . 1 | Type of Service or Traffic Class. | |
| <added>pduSetMarking | PDUSetMarking | O | 0 . . . 1 | Configuration information for the PDU Set and end of burst marking. </added> | |

That is, in this example, the row "pduSetMarking" has been added and includes configuration information for PDU Set and EoB marking, according to the techniques of this disclosure.

The PDUSetMarking data type may be defined as follows:

| Attribute name | Data type | P | Cardinality | Description | Applicability |
|---|---|---|---|---|---|
| version | Integer | O | 0 . . . 1 | | |
| localIdentifier | Integer | M | 0 . . . 1 | | |
| format | Boolean | O | 0 . . . 1 | | |
| pduSetSizeActive | Boolean | O | 0 . . . 1 | | |
| eobMarkingActive | Boolean | O | 0 . . . 1 | | |

Additionally or alternatively, MSH 158 may be configured to pass information about the session, including media components of the session and the PDU Set and EoB marking configuration for the session. The dynamic policy information configured by MSH 158 for the session may contain the following information:

| Attribute name | Data type | P | Cardinality | Description |
|---|---|---|---|---|
| policyTemplateId | ResourceId | O | 0 . . . 1 | Identifier of the provisioned policy template |
| mediaComponentQoS | Array(MediaComponentQoS) | M | 0 . . . n | A list of QoS allocation specifications for the media sessions of the WebRTC session. |

The MediaComponentQoS object may contain the following information:

| Attribute name | Data type | P | Cardinality | Description |
|---|---|---|---|---|
| Name | string | M | 1 | Unique identifier of this media component in the session |
| flowDescription | FlowDescription | M | 1 | The flow description, provided as a 5-Tuple, for the media component. |
| qosAllocation | M5QoSSpecification | M | 1 | The QoS description as described in 3GPP TS 26.512, which applies to the stream with the given flow description. |

A QoS policy template may be extended to include a name for each sub-component of the session. This name may then be used to associate the actual media stream with the QoS sub-component policy. Any or all of the various RTC AFs as shown in FIG. 1 may then use this mapping to associate a network assistance request for each media stream to the corresponding sub-component of the QoS policy. The RTC AFs may also use this information to verify that the requested/desired QoS for each component is aligned with the provisioned QoS policy be 5G RTC application provider 102, which may also be referred to as an application service provider (ASP).

Thus, per the techniques of this disclosure, 5G RTC signaling server AF 118 may receive, from 5G RTC application provider 102, configuration data for an XR communication session (performed via WebRTC). It is generally desirable for real-time media communication sessions, such as XR communication sessions, to transmit data between endpoints (e.g., UEs) with low latency, to ensure that participants in the XR communication session can experience events in the XR communication session (e.g., other participant movements and interactions with a virtual environment, the participant's own interactions with the virtual environment, or the like) in very near real-time. Thus, the XR communication session may request a high level of quality of service (QOS).

The configuration data may include either or both of protocol data unit (PDU) set marking and/or end of burst (EoB) marking for the XR communication session. Such PDU set marking or EoB marking may be used to associate traffic with a requested QoS. 5G RTC signaling server AF 118 may send, to one or more other RTC AFs 104, data indicative of the PDU set marking and/or EoB marking for the XR communication session. One or more of RTC AFs 104 may also interact with PCF 160 to negotiate the requested QoS for the XR communication session. In this manner, network devices (e.g., base stations, such as gNBs) between the participants engaged in the XR communication session may examine the PDU set markings and/or EoB markings for data transmitted as part of the XR communication session and determine that such markings are associated with the negotiated QoS level, and therefore prioritize transmission of the data of the XR communication session to satisfy the QoS level. Such PDU set markings and/or EoB markings may be placed in RTP header extensions of RTP packets including the data of the XR communication session.

Figure 2:
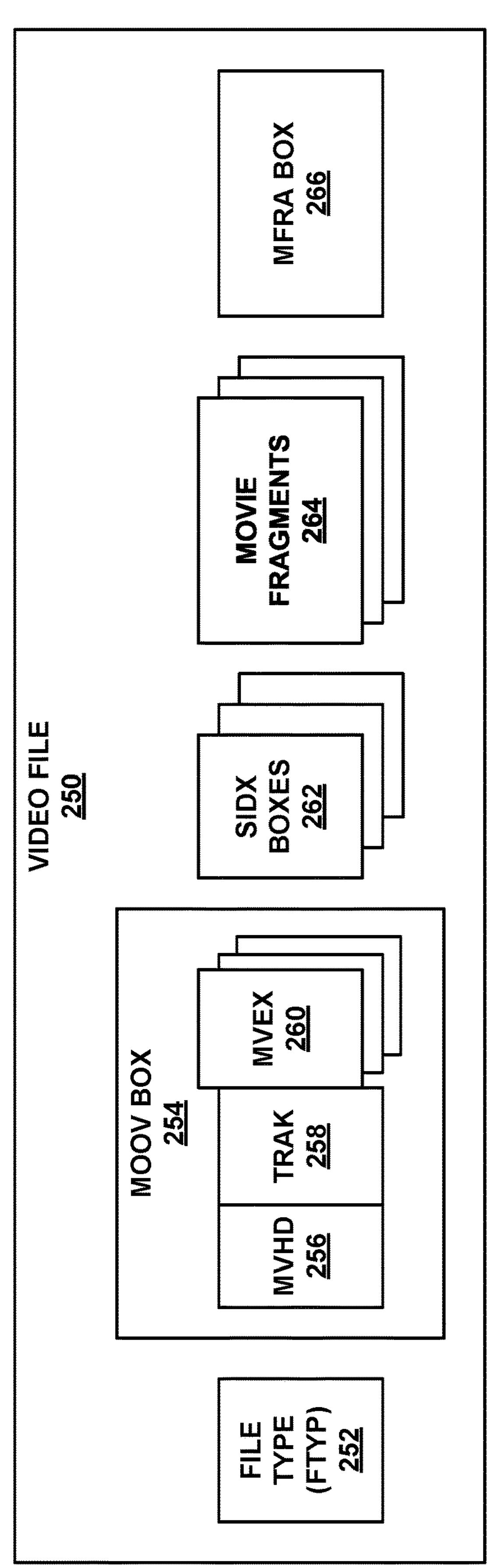
FIG. 2 is a block diagram illustrating elements of an example video file.

FIG. 2 is a block diagram illustrating elements of an example video file 250. Video files in accordance with the ISO base media file format and extensions thereof store data in a series of objects, referred to as "boxes." In the example of FIG. 2, video file 250 includes file type (FTYP) box 252, movie (MOOV) box 254, segment index (sidx) boxes 262, movie fragment (MOOF) boxes 264, and movie fragment random access (MFRA) box 266. Although FIG. 2 represents an example of a video file, it should be understood that other media files may include other types of media data (e.g., audio data, timed text data, or the like) that is structured similarly to the data of video file 250, in accordance with the ISO base media file format and its extensions.

File type (FTYP) box 252 generally describes a file type for video file 250. File type box 252 may include data that identifies a specification that describes a best use for video file 250. File type box 252 may alternatively be placed before MOOV box 254, movie fragment boxes 264, and/or MFRA box 266.

MOOV box 254, in the example of FIG. 2, includes movie header (MVHD) box 256, track (TRAK) box 258, and one or more movie extends (MVEX) boxes 260. In general, MVHD box 256 may describe general characteristics of video file 250. For example, MVHD box 256 may include data that describes when video file 250 was originally created, when video file 250 was last modified, a timescale for video file 250, a duration of playback for video file 250, or other data that generally describes video file 250.

TRAK box 258 may include data for a track of video file 250. TRAK box 258 may include a track header (TKHD) box that describes characteristics of the track corresponding to TRAK box 258. In some examples, TRAK box 258 may include coded video pictures, while in other examples, the coded video pictures of the track may be included in movie fragments 264, which may be referenced by data of TRAK box 258 and/or sidx boxes 262.

In some examples, video file 250 may include more than one track. Accordingly, MOOV box 254 may include a number of TRAK boxes equal to the number of tracks in video file 250. TRAK box 258 may describe characteristics of a corresponding track of video file 250. For example, TRAK box 258 may describe temporal and/or spatial information for the corresponding track. A TRAK box similar to TRAK box 258 of MOOV box 254 may describe characteristics of a parameter set track, when encapsulation unit 30 (FIG. 1) includes a parameter set track in a video file, such as video file 250. Encapsulation unit 30 may signal the presence of sequence level SEI messages in the parameter set track within the TRAK box describing the parameter set track.

MVEX boxes 260 may describe characteristics of corresponding movie fragments 264, e.g., to signal that video file 250 includes movie fragments 264, in addition to video data included within MOOV box 254, if any. In the context of streaming video data, coded video pictures may be included in movie fragments 264 rather than in MOOV box 254. Accordingly, all coded video samples may be included in movie fragments 264, rather than in MOOV box 254.

MOOV box 254 may include a number of MVEX boxes 260 equal to the number of movie fragments 264 in video file 250. Each of MVEX boxes 260 may describe characteristics of a corresponding one of movie fragments 264. For example, each MVEX box may include a movie extends header box (MEHD) box that describes a temporal duration for the corresponding one of movie fragments 264.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 264. Encapsulation unit 30 may further signal the presence of a sequence data set and/or sequence level SEI messages as being present in one of movie fragments 264 within the one of MVEX boxes 260 corresponding to the one of movie fragments 264.

SIDX boxes 262 are optional elements of video file 250. That is, video files conforming to the 3GPP file format, or other such file formats, do not necessarily include SIDX boxes 262. In accordance with the example of the 3GPP file format, a SIDX box may be used to identify a sub-segment of a segment (e.g., a segment contained within video file 250). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub) segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 262 generally provide information representative of one or more sub-segments of a segment included in video file 250. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 264 may include one or more coded video pictures. In some examples, movie fragments 264 may include one or more groups of pictures (GOPs), each of which may include a number of coded video pictures, e.g., frames or pictures. In addition, as described above, movie fragments 264 may include sequence data sets in some examples. Each of movie fragments 264 may include a movie fragment header box (MFHD, not shown in FIG. 2). The MFHD box may describe characteristics of the corresponding movie fragment, such as a sequence number for the movie fragment. Movie fragments 264 may be included in order of sequence number in video file 250.

MFRA box 266 may describe random access points within movie fragments 264 of video file 250. This may assist with performing trick modes, such as performing seeks to particular temporal locations (i.e., playback times) within a segment encapsulated by video file 250. MFRA box 266 is generally optional and need not be included in video files, in some examples. Likewise, a client device, such as client device 40, does not necessarily need to reference MFRA box 266 to correctly decode and display video data of video file 250. MFRA box 266 may include a number of track fragment random access (TFRA) boxes (not shown) equal to the number of tracks of video file 250, or in some examples, equal to the number of media tracks (e.g., non-hint tracks) of video file 250.

In some examples, movie fragments 264 may include one or more stream access points (SAPs), such as IDR pictures. Likewise, MFRA box 266 may provide indications of locations within video file 250 of the SAPs. Accordingly, a temporal sub-sequence of video file 250 may be formed from SAPs of video file 250. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 3:
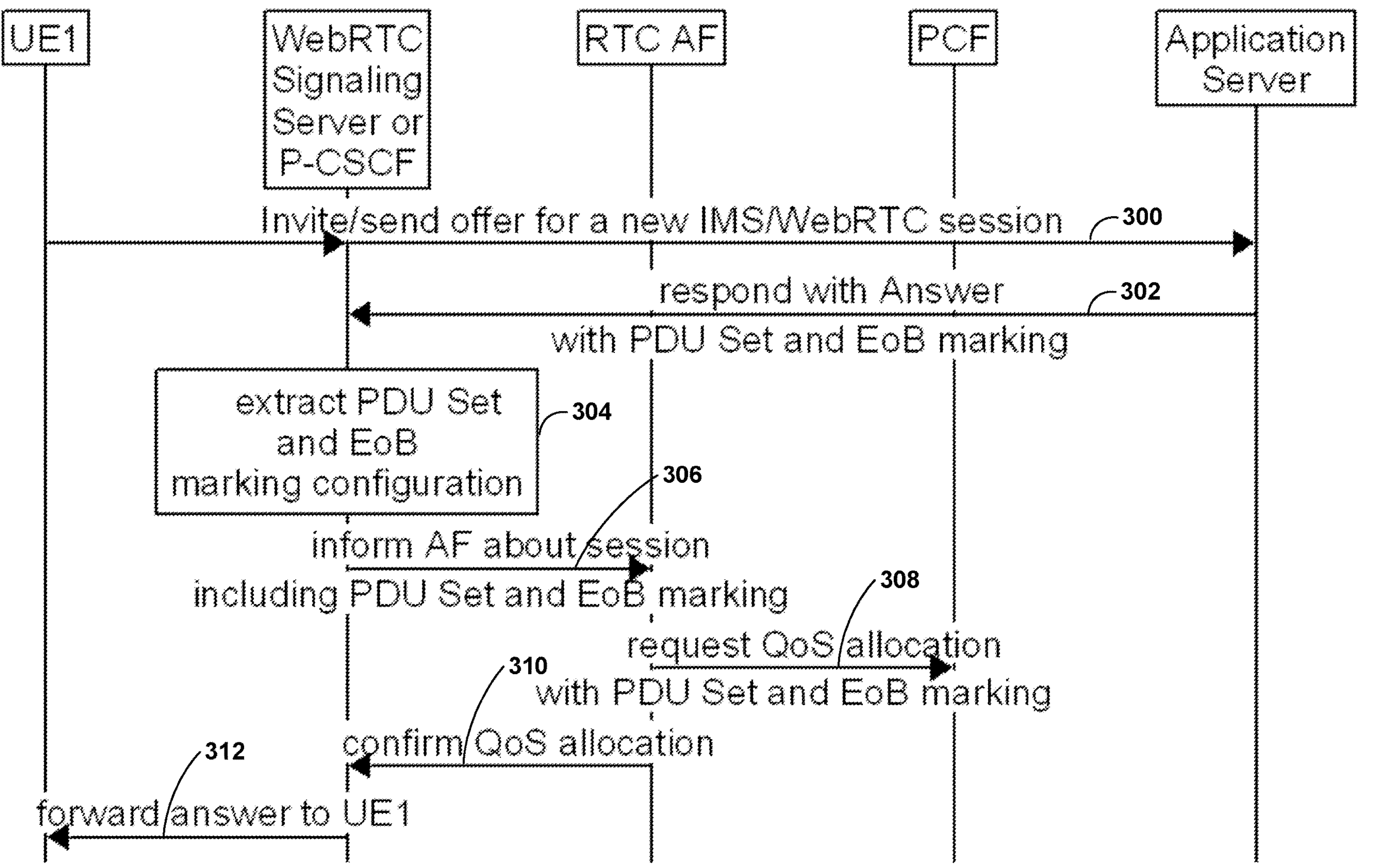
FIG. 3 is a flow diagram illustrating an example method for using protocol data unit (PDU) Set and End of Burst (EoB) marking according to techniques of this disclosure.

FIG. 3 is a flow diagram illustrating an example method for using PDU Set and EoB marking according to techniques of this disclosure. UE1 of FIG. 3 may correspond to UE 150 of FIG. 1. An intermediate server, such as a trusted WebRTC signaling server or a proxy-call session control function (P-CSCF), may be configured to inspect a session description protocol (SDP) offer/answer and extract information related to the PDU Set and End of Burst marking. The WebRTC Signaling Server or P-CSCF of FIG. 3 may correspond to 5G RTC signaling server AF 118 of FIG. 1. The RTC AF of FIG. 3 may correspond to one or more of the other RTC AFs 104 of FIG. 1. The policy and charging function (PCF) of FIG. 3 may correspond to PCF 160 of FIG. 1. The application server of FIG. 3 may correspond to 5G RTC application provider 102 of FIG. 1.

Initially, in the example of FIG. 3, UE1 sends an SDP offer for the establishment of an XR session to the WebRTC Signaling Server or P-CSCF, and the Signaling Server forwards the request to the Application Server (300).

The Application Server then responds with an SDP answer (302). That is, the Application Server sends an SDP answer to the Signaling Server. The Application Server includes an indication of the PDU Set marking and/or End of Burt marking in the SDP answer, as discussed above. For example, the Application Server may signal a MediaSubComponent data element as discussed above, which may include data representing whether PDU set marking and/or eOb marking is active for the XR communication session.

The Signaling Server inspects the SDP answer and extracts the information related to the PDU Set and End of Burst marking (304). For example, the Signaling Server may extract data indicating whether PDU set size and/or EoB marking is active for the corresponding XR communication session, e.g., per the PDU Set Marking data element discussed above.

The Signaling Server may then inform the RTC AF(s) about the new IMS/WebRTC session, including information about the configuration for the PDU Set and EoB marking (306).

The RTC AF then requests QOS allocation from the PCF corresponding to the PDU set marking and/or the EoB marking (308). For example, the RTC AF may use the Npcf_Policy Authorization procedure of TS 29.514 to request allocation of the QoS for the media sessions of the IMS/WebRTC session.

The RTC AF may then confirm the allocation of the QoS for the media streams to the Signaling Server (310). Likewise, the Signaling Server may receive this confirmation.

In response to receiving the confirmation, the Signaling Server may forward the SDP answer to UE1 (312). UE1 may then commence participation in the XR communication session. For example, UE1 may send and receive media data of the XR communication session. RTC AFs may add the PDU set marking and/or EoB marking to appropriate packets of the XR communication session sent by UE1 and/or read the PDU set marking and/or EoB marking of packets of the XR communication session to be received by UE1, and apply the corresponding QoS to such packets as authorized by the PCF.

In the case that the SDP message is encrypted, a dedicated WebRTC signaling protocol message may be defined to convey the configuration from the application server to the WebRTC signaling server.

Figure 4:
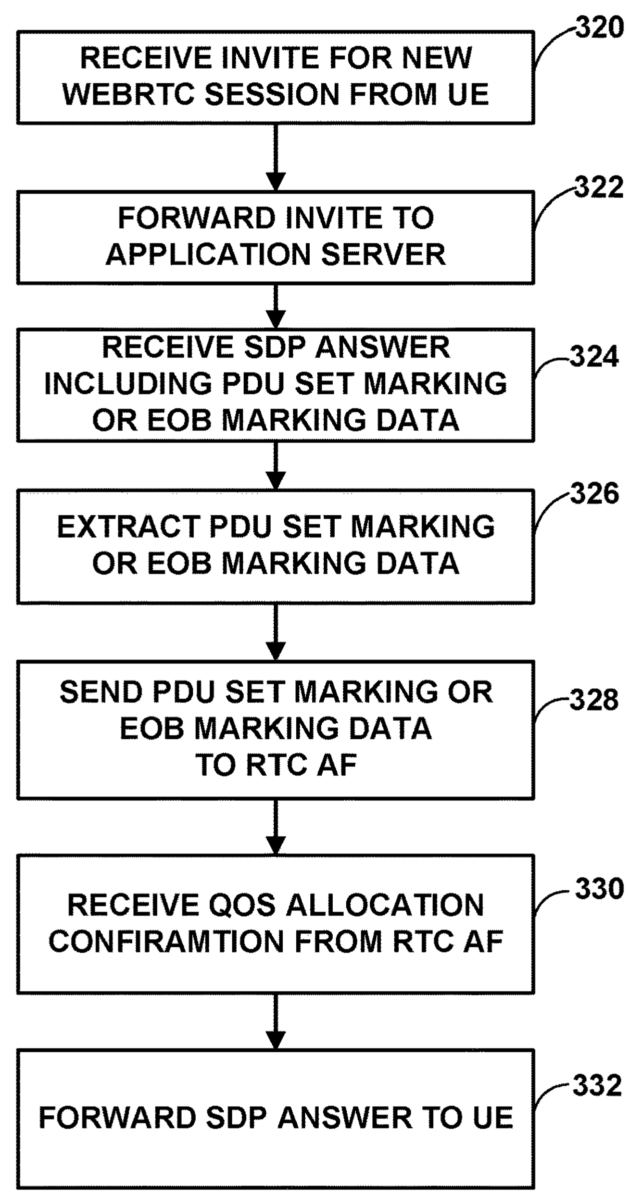
FIG. 4 is a flowchart illustrating an example of a method of communicating XR media data according to the techniques of this disclosure.

FIG. 4 is a flowchart illustrating an example of a method of communicating XR media data according to the techniques of this disclosure. The method of FIG. 4 may be performed by a signaling server, such as a WebRTC signaling server or a P-CSCF.

Initially, the signaling server may receive an invite for a new WebRTC session from a UE (320). The UE may send the invite to another UE to participate in the WebRTC session, and the signaling server may intercept the invite. The signaling server may then forward the invite to an application server (322).

The application server may process the invite, and respond with an SDP answer including data representing at least one of PDU set marking and/or EoB marking for the WebRTC session. Thus, the signaling server may receive the SDP answer including the PDU set marking and/or EoB marking data (324). The signaling server may then extract the PDU set and/or EoB marking configuration data (326). The signaling server may send the PDU set and/or EoB marking data to an RTC application function (AF) (328) to cause the RTC AF to request quality of service (QOS) allocation associated with the PDU set marking and/or EoB marking. Thus, the signaling server may receive a QoS allocation configuration from the RTC AF (330). In response, the signaling server may forward the SDP answer to the UE (332).

In this manner, the method of FIG. 4 represents an example of a method of communicating media data, including: receiving a session description protocol (SDP) message including configuration information representing at least one of protocol data unit (PDU) set marking or end of burst (EoB) marking for a communication session; sending information representing the PDU set marking or the EoB marking for the communication session to a Real-time Communication (RTC) application function; and processing media data of the communication session, the media data including at least one of a PDU set having the PDU set marking or an EoB having the EoB marking according to the configuration information.

Various examples of the techniques of this disclosure are summarized in the following clauses:

Clause 1: A method of communicating media data, the method comprising: communicating configuration information representing at least one of protocol data unit (PDU) set marking or end of burst (EoB) marking; and processing at least one of a PDU set having a PDU set marking according to the configuration information or an EoB having an EoB marking according to the configuration information.

Clause 2: The method of clause 1, wherein communicating the configuration information comprises communicating a MediaSubComponent data type including the configuration information.

Clause 3: The method of any of clauses 1 and 2, wherein the configuration information includes at least one of a version value, a local identifier value, a format value, a value indicating whether a PDU set size is active, or a value indicating whether an EoB marking is active.

Clause 4: The method of clause 1, wherein communicating the configuration information comprises communicating a list of quality of service (QOS) allocation specifications of a Web Real-time Communication (WebRTC) session, each of the QoS allocation specifications including a name value, a flow description, and a QoS allocation value.

Clause 5: The method of any of clauses 1-4, wherein communicating the configuration information comprises communicating, by an application server (AS), the configuration information.

Clause 6: The method of clause 5, further comprising receiving an offer for a new Web Real-time Communication (WebRTC) session, wherein communicating the configuration information comprises sending a response to the offer including the configuration information to a WebRTC signaling server or a proxy-call session control function (P-CSCF).

Clause 7: The method of any of clauses 1-3, wherein communicating the configuration information comprises communicating, by a Web Real-time Communication (WebRTC) signaling server or a proxy-call session control function (P-CSCF), the configuration information.

Clause 8: The method of clause 7, wherein communicating the configuration information comprises receiving an answer to a request for a new WebRTC session, the answer including the configuration information.

Clause 9: The method of any of clauses 7 and 8, further comprising sending information indicative of the new WebRTC session, the information indicating that the new WebRTC uses the least one of the PDU set having the PDU set marking or the EoB having the EoB marking, to a Real-time Communication (RTC) application function.

Clause 10: The method of any of clauses 7-9, further comprising receiving a confirmation of a quality of service (QOS) allocation.

Clause 11: The method of any of clauses 8-10, further comprising forwarding the answer to a user equipment (UE).

Clause 12: The method of clause 1, wherein communicating the configuration information comprises communicating a MediaSubComponent data type including the configuration information.

Clause 13: The method of clause 1, wherein the configuration information includes at least one of a version value, a local identifier value, a format value, a value indicating whether a PDU set size is active, or a value indicating whether an EoB marking is active.

Clause 14: The method of clause 1, wherein communicating the configuration information comprises communicating a list of quality of service (QOS) allocation specifications of a Web Real-time Communication (WebRTC) session, each of the QoS allocation specifications including a name value, a flow description, and a QoS allocation value.

Clause 15: The method of clause 1, wherein communicating the configuration information comprises communicating, by an application server (AS), the configuration information.

Clause 16: The method of clause 15, further comprising receiving an offer for a new Web Real-time Communication (WebRTC) session, wherein communicating the configuration information comprises sending a response to the offer including the configuration information to a WebRTC signaling server or a proxy-call session control function (P-CSCF).

Clause 17: The method of clause 1, wherein communicating the configuration information comprises communicating, by a Web Real-time Communication (WebRTC) signaling server or a proxy-call session control function (P-CSCF), the configuration information.

Clause 18: The method of clause 17, wherein communicating the configuration information comprises receiving an answer to a request for a new WebRTC session, the answer including the configuration information.

Clause 19: The method of clause 7, further comprising sending information indicative of the new WebRTC session, the information indicating that the new WebRTC uses the least one of the PDU set having the PDU set marking or the EoB having the EoB marking, to a Real-time Communication (RTC) application function.

Clause 20: The method of clause 7, further comprising receiving a confirmation of a quality of service (QOS) allocation.

Clause 21: The method of clause 20, further comprising forwarding the answer to a user equipment (UE).

Clause 22: A device for retrieving media data, the device comprising one or more means for performing the method of any of clauses 1-21.

Clause 23: The device of clause 22, wherein the one or more means comprise a memory and a processor implemented in circuitry.

Clause 24: The device of clause 22, wherein the apparatus comprises at least one of: an integrated circuit; a microprocessor; or a wireless communication device.

Clause 25: A computer-readable storage medium having stored thereon instructions that, when executed, cause a processor to perform the method of any of clauses 1-21.

Clause 26: A device for retrieving media data, the device comprising: means for communicating configuration information representing at least one of protocol data unit (PDU) set marking or end of burst (EoB) marking; and means for processing at least one of a PDU set having a PDU set marking according to the configuration information or an EoB having an EoB marking according to the configuration information.

Clause 27: A method of communicating media data, the method comprising: receiving a session description protocol (SDP) message including configuration information representing at least one of protocol data unit (PDU) set marking or end of burst (EoB) marking for a communication session; sending information representing the PDU set marking or the EoB marking for the communication session to a Real-time Communication (RTC) application function; and processing media data of the communication session, the media data including at least one of a PDU set having the PDU set marking or an EoB having the EoB marking according to the configuration information.

Clause 28: The method of clause 27, wherein the SDP message comprises a MediaSubComponent data type including the configuration information.

Clause 29: The method of clause 27, wherein the configuration information includes at least one of a version value, a local identifier value, a format value, a value indicating whether a PDU set size is active, or a value indicating whether an EoB marking is active.

Clause 30: The method of clause 27, wherein the communication session comprises a Web Real-time Communication (WebRTC) session, and wherein the configuration information comprises a list of quality of service (QOS) allocation specifications of the WebRTC session, each of the QoS allocation specifications including a name value, a flow description, and a QoS allocation value.

Clause 31: The method of clause 27, wherein receiving the SDP message comprises receiving, by a Web Real-time Communication (WebRTC) signaling server or a proxy-call session control function (P-CSCF), the SDP message.

Clause 32: The method of clause 31, wherein the SDP message comprises an SDP answer to an SDP request for a new WebRTC session.

Clause 33: The method of clause 32, further comprising forwarding the SDP answer to a user equipment (UE).

Clause 34: The method of clause 32, wherein sending the information representing the PDU set marking or the EoB marking comprises sending information indicative of the new WebRTC session, the information indicating that the new WebRTC uses the least one of the PDU set having the PDU set marking or the EoB having the EoB marking, to the RTC application function.

Clause 35: The method of clause 31, further comprising receiving a confirmation of a quality of service (QOS) allocation.

Clause 36: A device for communicating media data, the device comprising: a memory configured to store media data; and a processing system comprising one or more processors implemented in circuitry, the processing system being configured to: receive a session description protocol (SDP) message including configuration information representing at least one of protocol data unit (PDU) set marking or end of burst (EoB) marking for a communication session; send information representing the PDU set marking or the EoB marking for the communication session to a Real-time Communication (RTC) application function; and process media data of the communication session, the media data including at least one of a PDU set having the PDU set marking or an EoB having the EoB marking according to the configuration information.

Clause 37: The device of clause 27, wherein the SDP message comprises a MediaSubComponent data type including the configuration information.

Clause 38: The device of clause 36, wherein the configuration information includes at least one of a version value, a local identifier value, a format value, a value indicating whether a PDU set size is active, or a value indicating whether an EoB marking is active.

Clause 39: The device of clause 36, wherein the communication session comprises a Web Real-time Communication (WebRTC) session, and wherein the configuration information comprises a list of quality of service (QOS) allocation specifications of the WebRTC session, each of the QoS allocation specifications including a name value, a flow description, and a QoS allocation value.

Clause 40: The device of clause 36, wherein receiving the SDP message comprises receiving, by a Web Real-time Communication (WebRTC) signaling server or a proxy-call session control function (P-CSCF), the SDP message.

Clause 41: The device of clause 40, wherein the SDP message comprises an SDP answer to an SDP request for a new WebRTC session.

Clause 42: The device of clause 41, wherein the processing system is further configured to forward the SDP answer to a user equipment (UE).

Clause 43: The device of clause 41, wherein to send the information representing the PDU set marking or the EoB marking, the processing system is configured to send information indicative of the new WebRTC session, the information indicating that the new WebRTC uses the least one of the PDU set having the PDU set marking or the EoB having the EoB marking, to the RTC application function.

Clause 44: The device of clause 40, wherein the processing system is further configured to receive a confirmation of a quality of service (QOS) allocation.

Clause 45: A device for communicating media data, the device comprising: means for receiving a session description protocol (SDP) message including configuration information representing at least one of protocol data unit (PDU) set marking or end of burst (EoB) marking for a communication session; means for sending information representing the PDU set marking or the EoB marking for the communication session to a Real-time Communication (RTC) application function; and means for processing media data of the communication session, the media data including at least one of a PDU set having the PDU set marking or an EoB having the EoB marking according to the configuration information.

Clause 46: The device of clause 45, further comprising means for executing a Web Real-time Communication (WebRTC) signaling server or means for executing a proxy-call session control function (P-CSCF).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of communicating media data, the method comprising:

receiving, by a network device, a session description protocol (SDP) message including configuration information representing at least one of protocol data unit (PDU) set marking or end of burst (EoB) marking for a communication session during a startup phase of the communication session or a configuration update phase of the communication session, the startup phase or the configuration update phase being negotiated between devices participating in the communication session, the devices participating in the communication session including a user equipment (UE) and an application server or a remote UE, the network device being separate from the UE and the application server or the remote UE;

extracting, by the network device, a header extension map attribute from the SDP message, the header extension map attribute linking a local identifier value to a uniform resource name (URN) corresponding to the at least one of the PDU set marking or the EoB marking;

determining, by the network device, a format for the PDU set marking or the EoB marking according to the header extension map attribute;

sending, by the network device, information representing the PDU set marking or the EoB marking for the communication session to a media application function; and processing, by the network device, a packet including media data of the communication session, the packet including a header extension including the local identifier value and the at least one of the PDU set marking or the EoB marking according to the header extension map attribute.

2. The method of claim 1, wherein the SDP message comprises a real-time transport protocol (RTP) session message including the configuration information.

3. The method of claim 1, wherein the configuration information includes at least one of a version value, a local identifier value, a format value, a value indicating whether a PDU set size is active, or a value indicating whether an EoB marking is active.

4. The method of claim 1, wherein the communication session comprises a Web Real-time Communication (WebRTC) session, and wherein the configuration information comprises a list of quality of service (QoS) allocation specifications of the WebRTC session, each of the QoS allocation specifications including a name value, a flow description, and a QoS allocation value.

5. The method of claim 1, wherein receiving the SDP message comprises receiving, by a Web Real-time Communication (WebRTC) signaling server or a proxy-call session control function (P-CSCF), the SDP message.

6. The method of claim 5, wherein the SDP message comprises an SDP answer to an SDP request for a new WebRTC session.

7. The method of claim 6, further comprising forwarding the SDP answer to the UE.

8. The method of claim 6, wherein sending the information representing the PDU set marking or the EoB marking comprises extracting information indicative of the new WebRTC session from the SDP message and sending the information to the media application function to cause the media application function to forward the information to a policy control function (PCF), the information indicating that the new WebRTC session uses the at least one of the PDU set marking or the EoB marking.

9. The method of claim 5, further comprising receiving a confirmation of a quality of service (QoS) allocation.

10. A device for communicating media data, the device comprising:

a memory configured to store media data; and a processing system comprising one or more processors implemented in circuitry, the processing system being configured to:

receive a session description protocol (SDP) message including configuration information representing at least one of protocol data unit (PDU) set marking or end of burst (EoB) marking for a communication session during a startup phase of the communication session or a configuration update phase of the communication session, the startup phase or the configuration update phase being negotiated between devices participating in the communication session, the devices participating in the communication session including a user equipment (UE) and an application server or a remote UE, the device being separate from the UE and the application server or the remote UE;

extract a header extension map attribute from the SDP message, the header extension map attribute linking a local identifier value to a uniform resource name (URN) corresponding to the at least one of the PDU set marking or the EoB marking;

determine a format for the PDU set marking or the EoB marking according to the header extension map attribute;

send information representing the PDU set marking or the EoB marking for the communication session to a media application function; and process a packet including media data of the communication session, the packet including a header extension including the local identifier value and the at least one of the PDU set marking or the EoB marking according to the header extension map attribute.

11. The device of claim 10, wherein the SDP message comprises a real-time transport protocol (RTP) session message including the configuration information.

12. The device of claim 10, wherein the configuration information includes at least one of a version value, a local identifier value, a format value, a value indicating whether a PDU set size is active, or a value indicating whether an EoB marking is active.

13. The device of claim 10, wherein the communication session comprises a Web Real-time Communication (WebRTC) session, and wherein the configuration information comprises a list of quality of service (QoS) allocation specifications of the WebRTC session, each of the QoS allocation specifications including a name value, a flow description, and a QoS allocation value.

14. The device of claim 10, wherein receiving the SDP message comprises receiving, by a Web Real-time Communication (WebRTC) signaling server or a proxy-call session control function (P-CSCF), the SDP message.

15. The device of claim 14, wherein the SDP message comprises an SDP answer to an SDP request for a new WebRTC session.

16. The device of claim 15, wherein the processing system is further configured to forward the SDP answer to the UE.

17. The device of claim 15, wherein to send the information representing the PDU set marking or the EoB marking, the processing system is configured to extract information indicative of the new WebRTC session from the SDP message and send the information to the media application function to cause the media application function to forward the information to a policy control function (PCF), the information indicating that the new WebRTC session uses the at least one of the PDU set marking or the EoB marking.

18. The device of claim 14, wherein the processing system is further configured to receive a confirmation of a quality of service (QoS) allocation.

19. A device for communicating media data, the device comprising:

means for receiving a session description protocol (SDP) message including configuration information representing at least one of protocol data unit (PDU) set marking or end of burst (EoB) marking for a communication session during a startup phase of the communication session or a configuration update phase of the communication session, the startup phase or the configuration update phase being negotiated between devices participating in the communication session, the devices participating in the communication session including a user equipment (UE) and an application server or a remote UE, the device being separate from the UE and the application server or the remote UE;

means for extracting a header extension map attribute from the SDP message, the header extension map attribute linking a local identifier value to a uniform resource name (URN) corresponding to the at least one of the PDU set marking or the EoB marking;

means for determining a format for the PDU set marking or the EoB marking according to the header extension map attribute;

means for sending information representing the PDU set marking or the EoB marking for the communication session to a media application function; and means for processing a packet including media data of the communication session, the packet including a header extension including the local identifier value and the at least one of the PDU set marking or the EoB marking according to the header extension map attribute.

20. The device of claim 19, further comprising means for executing a Web Real-time Communication (WebRTC) signaling server or means for executing a proxy-call session control function (P-CSCF).

* * * * *